(12) United States Patent
Antony et al.

(10) Patent No.: US 10,542,073 B2
(45) Date of Patent: Jan. 21, 2020

(54) FILE TRANSFER TO A DISTRIBUTED FILE SYSTEM

(71) Applicant: TATA CONSULTANCY SERVICES LIMITED, Mumbai (IN)

(72) Inventors: Jobin Antony, Kochi (IN); Abraham Varghese, Kochi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 200 days.

(21) Appl. No.: 14/497,503

(22) Filed: Sep. 26, 2014

(65) Prior Publication Data

US 2015/0095384 A1    Apr. 2, 2015

(30) Foreign Application Priority Data

Sep. 27, 2013 (IN) .......................... 3094/MUM/2013

(51) Int. Cl.
*G06F 16/182* (2019.01)
*H04L 29/08* (2006.01)
*H04L 29/06* (2006.01)

(52) U.S. Cl.
CPC ............ *H04L 67/06* (2013.01); *G06F 16/183* (2019.01); *H04L 67/1097* (2013.01); *H04L 63/168* (2013.01)

(58) Field of Classification Search
CPC . G06F 17/30203; H04L 63/168; H04L 67/06; H04L 67/1097
See application file for complete search history.

(56) References Cited

U.S. PATENT DOCUMENTS

| 5,712,976 A | * | 1/1998 | Falcon, Jr. | ............ G06F 3/0601 348/E5.008 |
| 7,506,368 B1 | * | 3/2009 | Kersey | ................ H04L 63/0428 726/12 |
| 8,566,452 B1 | * | 10/2013 | Goodwin | ............ H04L 63/0281 709/227 |
| 9,268,589 B2 | * | 2/2016 | Arcilla | ...................... G06F 8/60 |

(Continued)

OTHER PUBLICATIONS

"FIWARE.ArchitectureDescription.Data.BigData", FI-WARE Forge Wiki, 2008, 19 pages https://forge.fi-ware.org/plugins/mediawiki/wiki/fiware/index.php/FIWARE.ArchitectureDescription.Data.BigData#Providing_input_data_to_HDFS_throu.

(Continued)

*Primary Examiner* — Joshua Bullock
*Assistant Examiner* — Tiffany Thuy Bui
(74) *Attorney, Agent, or Firm* — Hamre, Schumann, Mueller & Larson, P.C.

(57) ABSTRACT

A file storage system to receive a file from a client device includes a determination module to determine a primary set of virtual segments from amongst a plurality of virtual segments of the file to be received from the client device. Each of the plurality of virtual segments is a logical portion of the file. The file storage system further includes a receiving module to establish a secure connection and a plurality of file transfer protocol connections corresponding to the secure connection, with the client device, to receive the primary set of virtual segments from the client device. The receiving module further receives, in parallel, the primary set of virtual segments from the client device for storage, through the plurality of file transfer protocol connections.

18 Claims, 3 Drawing Sheets

(56) References Cited

U.S. PATENT DOCUMENTS

| | | | | |
|---|---|---|---|---|
| 2002/0143888 A1* | 10/2002 | Lisiecki | G06F 17/3089 | 709/214 |
| 2004/0044891 A1* | 3/2004 | Hanzlik | H04L 63/0272 | 713/150 |
| 2005/0120223 A1* | 6/2005 | Kiwimagi | G06F 21/33 | 713/182 |
| 2007/0043874 A1* | 2/2007 | Nath | H04L 67/06 | 709/230 |
| 2007/0067332 A1* | 3/2007 | Gallagher | G06F 21/6227 | |
| 2007/0083574 A1* | 4/2007 | Garin, Jr. | G06F 17/30581 | 707/999.204 |
| 2010/0332818 A1* | 12/2010 | Prahlad | G06F 17/3002 | 713/150 |
| 2011/0029524 A1* | 2/2011 | Baptist | G06F 11/1076 | 707/737 |
| 2011/0107165 A1* | 5/2011 | Resch | G06F 11/1076 | 714/746 |
| 2011/0302583 A1* | 12/2011 | Abadi | G06F 17/30545 | 718/102 |
| 2012/0233228 A1* | 9/2012 | Barton | H04L 67/06 | 707/827 |
| 2014/0068259 A1* | 3/2014 | Resch | G06F 21/6272 | 713/167 |
| 2014/0108648 A1* | 4/2014 | Nelke | H04L 41/5051 | 709/224 |
| 2014/0181039 A1* | 6/2014 | Harrison | G06F 17/30091 | 707/652 |
| 2015/0089075 A1* | 3/2015 | Strigeus | G06F 17/30321 | 709/231 |
| 2015/0312243 A1* | 10/2015 | Ponsford | G06F 21/6218 | 713/159 |

OTHER PUBLICATIONS

Deyhim, Parviz, "Amazon Web Services—Best Practices for Amazon EMR", Aug. 2013, 38 pages.

* cited by examiner

FILE TRANSFER TO A DISTRIBUTED FILE SYSTEM

TECHNICAL FIELD

The present subject matter relates, in general, to file transfer and, in particular, to transfer of files to a distributed file system.

BACKGROUND

Organizations in retail, commercial, office, industrial, medical, legal, and other industries generate large individual files. One of the biggest challenges faced by the organizations today involves efficiently and effectively storing the large individual files. As amount of data in the large individual files continues to increase, the organizations are adopting Hadoop to store and manage the same.

The Hadoop is an open source programming framework that offers an efficient and effective method for storing and processing terabytes and petabytes of data. The Hadoop uses Hadoop Distributed File System (HDFS) as its storage system. The HDFS is a cluster of one or more machines with data storage capacity. Individual machines in the cluster are referred to as data nodes. Generally, the organizations use file transfer protocols, such as a Secure Shell File Transfer Protocol (SFTP) to transfer a large file to the data nodes of the HDFS.

BRIEF DESCRIPTION OF THE DRAWINGS

The detailed description is described with reference to the accompanying figure(s). In the figure(s), the left-most digit(s) of a reference number identifies the figure in which the reference number first appears. The same numbers are used throughout the figure(s) to reference like features and components. Some embodiments of systems and/or methods in accordance with embodiments of the present subject matter are now described, by way of example only, and with reference to the accompanying figure(s), in which.

DETAILED DESCRIPTION

Figure 1:
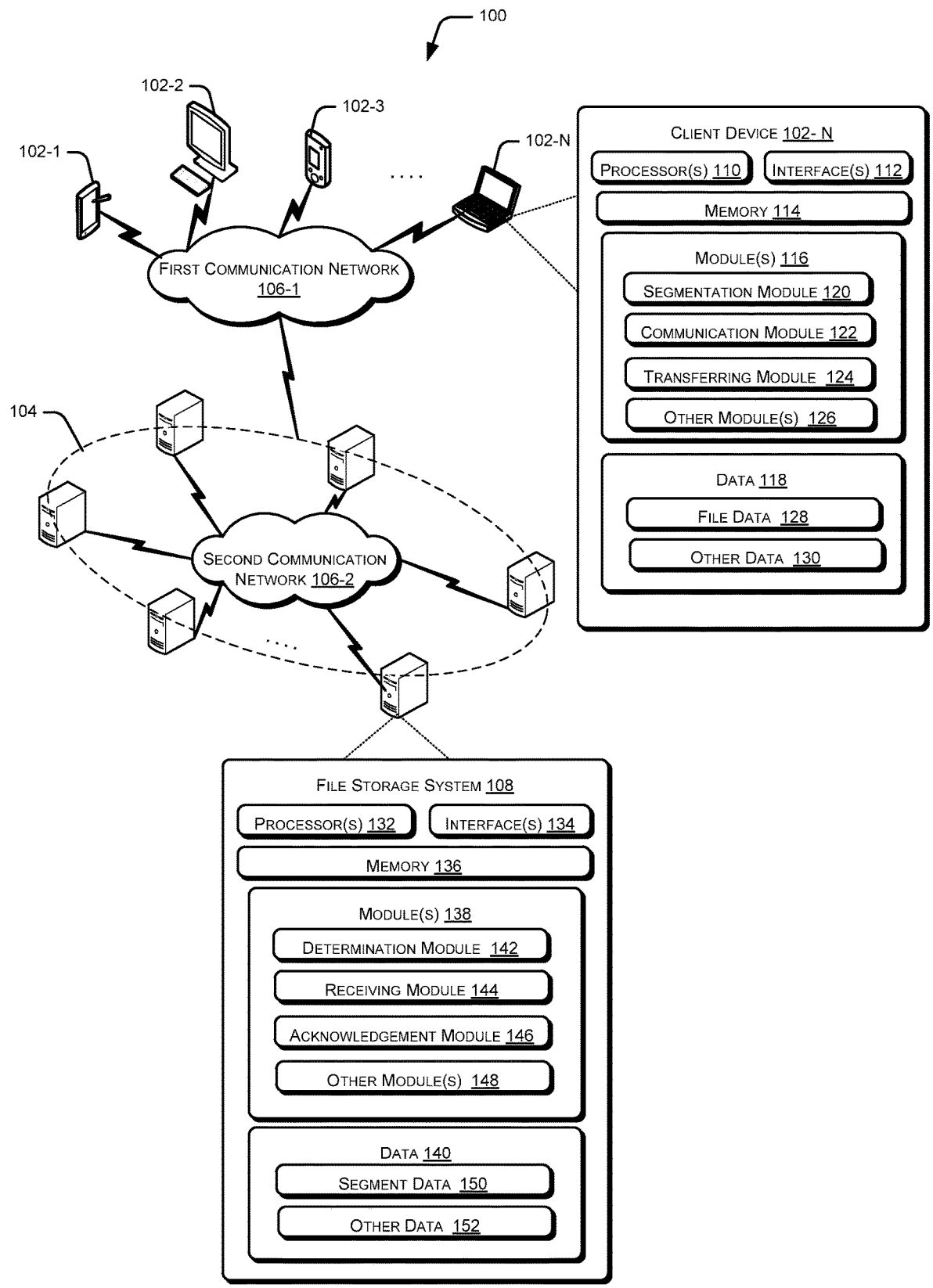
FIG. 1 illustrates a network environment implementation for transfer of a file to a distributed file system, according to an embodiment of the present subject matter.

With the advent of technology and increasing growth in volume of data being generated, organizations are adopting Hadoop to store the large volume of data. The Hadoop uses Hadoop Distributed File System (HDFS) as its storage system. The HDFS is designed to hold the large volume of data and provide access to this data to many client devices distributed across a network.

The HDFS includes a name node and a plurality of data nodes. The name node is a master server that manages file system namespace and regulates access to files by the client devices. The file system namespace may be understood as complete collection of all files in the HDFS. The client devices contact the name node in order to perform common file system namespace operations, such as storing, opening, closing, renaming, and deleting files. The name node does not store the files itself, but rather maintains a mapping between file metadata and the plurality of data nodes on which these files are stored. Although the name node manages the namespace, client devices can communicate directly with the plurality of data nodes in order to write a file into the plurality of data nodes of the HDFS.

Conventionally, when a client device has to transfer a large file, say of size one petabyte, to the plurality of data nodes of the HDFS, the client device may transfer the file by copying the file to a local file system, which may be a node of the HDFS, such as a Linux file system, and then upload the file from the local file system to the plurality of data nodes, through a network. The file may be copied to the local file system using a file transfer protocol, for example, a Secure Shell File Transfer Protocol (SFTP). The SFTP is a network protocol that provides file transfer functionality. In an example, the client device may create a single SFTP connection with the local file system to copy the file to the local file system. Once the file is transferred to the local file system, the same can be stored into the plurality of data nodes of the HDFS.

However, implementation of this method to transfer the file to the plurality of data nodes of the HDFS, may pose certain challenges. For example, since networks are inherently unreliable due to their expanse and complexity, the probability of network failure increases in proportion to the amount of data that is transmitted. Therefore, in case of network failure or some other issue during the transmission of the file, the file may be in transit between the client device and the local file system and, therefore the file would be lost. In such a scenario, the entire file may have to be retransmitted, thereby increasing the file transfer time. Therefore, the conventional method for transferring the file from the client device to the HDFS may be time consuming and inefficient in terms of performance.

The present subject matter describes systems and methods for transferring a file from a client device to a distributed file system. According to the present subject matter, in an embodiment, the file is segmented into multiple virtual segments and then the multiple virtual segments are transferred to a plurality of nodes of the distributed file system in parallel, unlike the conventional approach where, the entire file is transferred to the plurality of nodes of the distributed file system. Since, transfer of the multiple virtual segments is done in parallel; the time taken to transfer the file to the distributed file system is significantly alleviated. Further, according to an embodiment of the present subject matter, if there is a network failure or transfer of one or more virtual segments is interrupted, then only those one or more virtual segments may have to be retransmitted and not the entire file. As a result, the entire file is transferred to the distributed file system, such as HDFS, in very less time. Thus, according to the present subject matter, the transfer of the file from the client device to the distributed file system is efficient in terms of time consumed and performance.

According to an implementation, initially, a file to be transferred to a distributed file system is determined. In said implementation, the distributed file system may be a Hadoop Distributed File System (HDFS). The distributed file system may include one master node and a plurality of data nodes. In one example, the master node may be a name node. The plurality of data nodes may be responsible for storing the file, while the master node may be responsible for storing metadata for the entire file system. In one implementation, the name node may decide how the file should be stored in the plurality of data nodes.

Upon determination of the file to be transferred, the file may be segmented into a plurality of virtual segments. The segmentation of the file into the plurality of virtual segments may be understood as segmenting the file logically into a plurality of segments and not physically. In one implementation, a total number of virtual segments may be determined based on file size and optimum size of each of the plurality of virtual segments.

According to an implementation, size of each of the plurality of virtual segments may be equal to block size of the distributed file system. In another implementation, the size of each of the plurality of virtual segments may be a multiple of the block size of the distributed file system. For example, if the block size of the distributed file system is 64 megabytes (MB) and size of the file is 1 gigabytes (GB), then the file is segmented into a plurality of virtual segments of size 64 MB each.

Once the file is segmented into the plurality of virtual segments, each of the plurality of data nodes may identify one or more virtual segments from amongst the plurality of virtual segments to be stored by it. According to said implementation, the plurality of virtual segments may be equally allocated among the plurality of data nodes. In an example, if there are 4 data nodes and 16 virtual segments, then 4 virtual segments from amongst the 16 virtual segments may be allocated to each of the 4 data nodes.

Thereafter, in said implementation, a plurality of secure connection requests may be received from the plurality of data nodes of the distributed file system. In one example, a secure connection request may be a Secure Shell (SSH) connection request. Further, corresponding to each of the plurality of secure connections, at least one file transfer protocol connection request is obtained from the plurality of data nodes. In one implementation, the file transfer protocol connection request may be a Secure Shell File Transfer Protocol (SFTP) connection request. The SSH is a network protocol that allows a file to be exchanged, using a secure channel, between two networked devices and the SFTP is a network protocol that provides file access, file transfer, and file management functionalities. The SFTP protocol has an inbuilt capacity of reading a file logically. For example, by providing a start byte and an end byte of a virtual segment to be moved to the distributed file system, a data node can read and download the virtual segment from a client device though a SFTP connection.

Likewise, each of the plurality of data nodes reads and downloads the plurality of virtual segments from the client device through the plurality of secure connections, in parallel, where a virtual segment from amongst the plurality of virtual segments is transferred to a data node from amongst the plurality of data nodes through a respective file transfer protocol connection. Further, the virtual segment from amongst the plurality of virtual segments is stored on the data node from amongst the plurality of data nodes. Consider an example where number of data nodes is 2 and number of virtual segments is 4, such that first virtual segment is allocated to first data node, and second, third, and fourth virtual segments are allocated to second data node. Also consider that the file size is 5000 bytes, such that the first virtual segment is represented by a start byte 1 and by an end byte 1250, the second virtual segment is represented by a start byte 1251 and by an end byte 2500, the third virtual segment is represented by a start byte 2501 and by an end byte 3750, and the fourth virtual segment is represented by a start byte 3751 and by an end byte 5000. In this example the first data node may read the file from 1 byte to 1250 bytes through a SFTP connection. Further, in said example, the second data node may read the file from 1251 bytes to 2500 bytes through another SFTP connection, from 2501 bytes to 3750 bytes through yet another SFTP connection, and from 3751 bytes to 5000 bytes through yet another connection. The second data node reads all three virtual segments in parallel. Further, the first data node and the second data node also read their respective virtual segments in parallel.

Since the plurality of virtual segments is transferred in parallel, therefore, if there is a network failure or transfer of one or more virtual segments is interrupted because of failure of one or more file transfer protocol connections, then only those one or more virtual segments may have to be retransmitted and not the entire file. In case there is a file transfer protocol connection failure, then the one or more virtual segments may be retransmitted by re-establishing the failed file transfer protocol connection. Taking an example, where there are 4 data nodes and 16 virtual segments, and 4 virtual segments are allocated to each of the 4 data nodes, then in case of failure of first data node, only 4 virtual segments allocated to the first data node will have to be retransmitted, and not all the 16 virtual segments. In said example, if 3 out of 4 virtual segments have already been transferred to the first data node, then only fourth virtual segment may have to be retransmitted.

After downloading the plurality of virtual segments, each of the plurality of data nodes may report the download status, i.e., whether the virtual segments assigned to it have been successfully downloaded or not, to the master node, which monitors the file transfer process. In one implementation, the master node may be a name node. In case of failure, the virtual segments which are not successfully downloaded can be downloaded again. Finally, an Application programming interface (API) is called to logically merge the plurality of virtual segments into a single file.

According to the present subject matter, since transfer of the plurality of virtual segments of the file happens in parallel across the plurality of data nodes of the distributed file system, using multiple file transfer protocol connections, for example, SFTP connections, unlike the conventional approach where, the entire file is transferred to the plurality of data nodes, using a single SFTP connection. Since, the transfer of the plurality of virtual segments is done in parallel; the time taken to transfer the entire file to the distributed file system is significantly alleviated. Further, according to the present subject matter, if there is a network failure or transfer of one or more virtual segments is interrupted, then only those one or more virtual segments may have to be retransmitted and not the entire file. As a result, the entire file is transferred to the distributed file system, such as HDFS, in very less time. Thus, according to the present subject matter, the transfer of the file from the client device to the distributed file system is efficient in terms of time consumed and performance.

Figure 2:
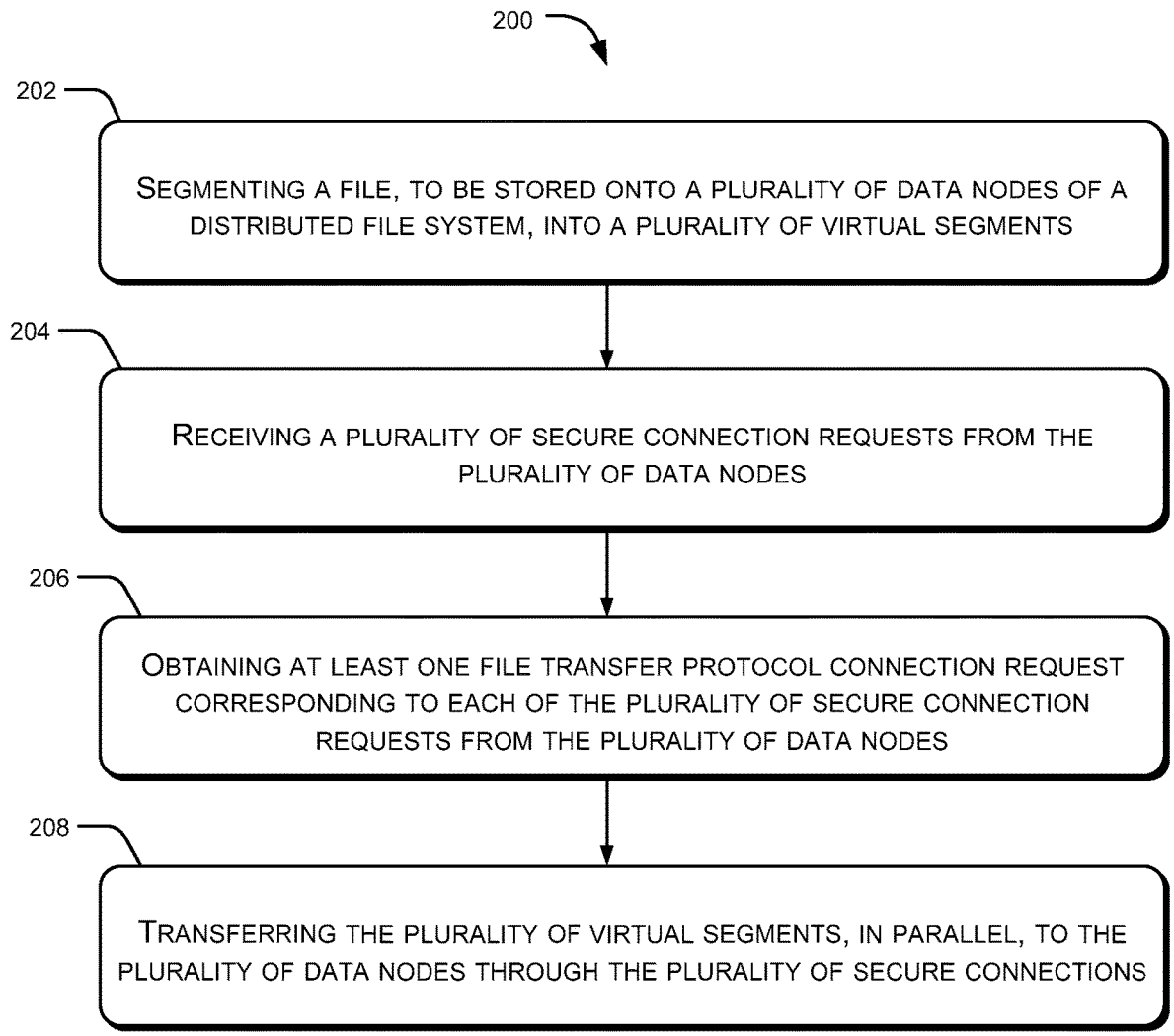
FIG. 2 illustrates a method for transferring the file to the distributed file system, according to an embodiment of the present subject matter.
Figure 3:
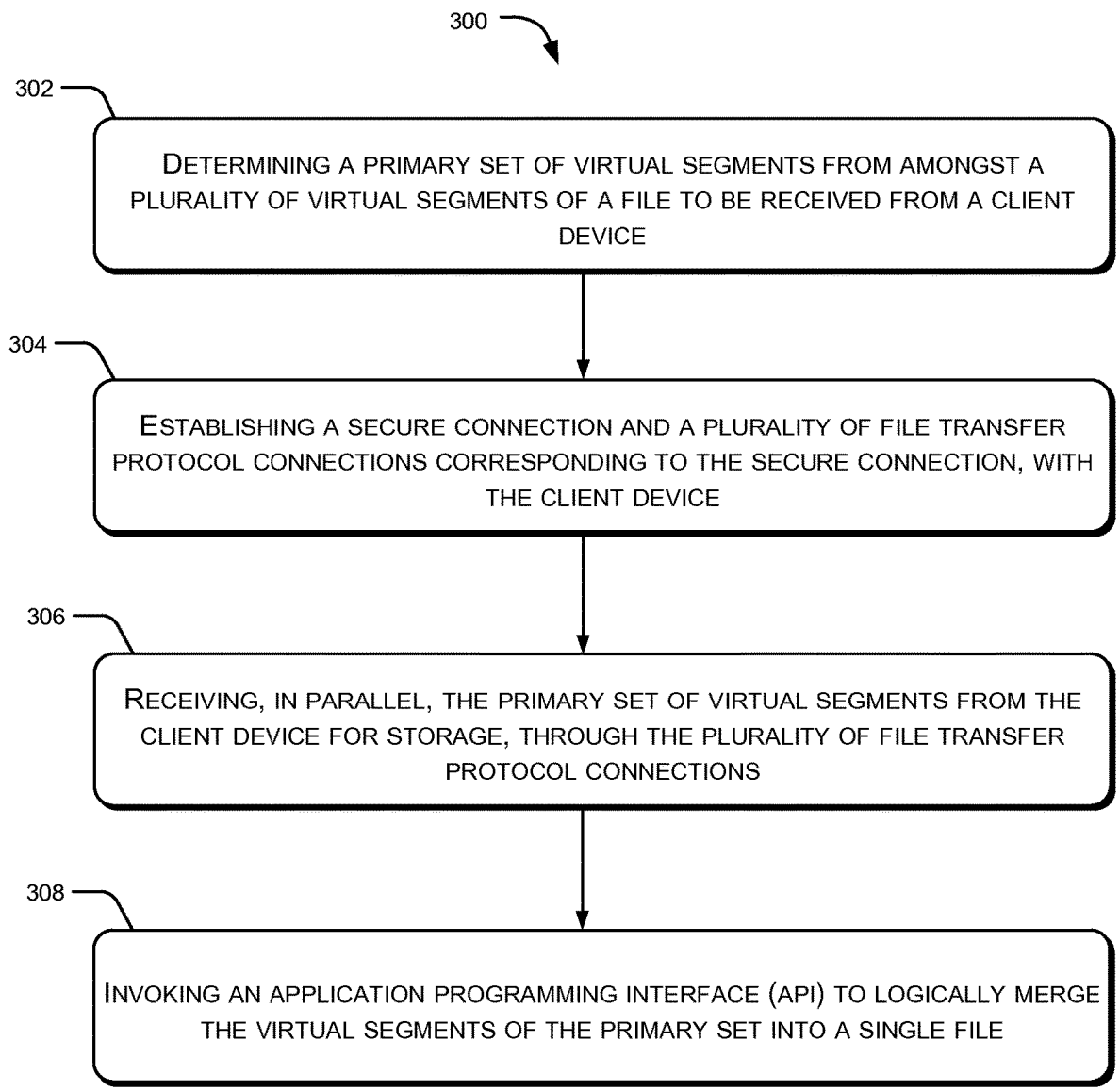
FIG. 3 illustrates a method for receiving the file from the client device, according to an embodiment of the present subject matter.

The manner in which the systems and methods for transferring a file to a distributed file system shall be implemented has been explained in details with respect to the FIGS. 1-3. While aspects of described systems and methods for transfer of the file to the distributed file system can be implemented in any number of different computing systems, transmission environments, and/or configurations, the embodiments are described in the context of the following exemplary system(s).

FIG. 1 illustrates a network environment 100 implementation for transfer of a file to a distributed file system, according to an embodiment of the present subject matter.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

In said embodiment, the network environment 100 includes one or more client devices 102-1, 102-2, 102-3, . . . , 102-N, individually and commonly referred to as client device(s) 102 hereinafter, connected to the distributed file system 104 through a first communication network 106-1. The distributed file system 104 may be a Hadoop Distributed File System (HDFS). The client devices 102 may include computing devices, such as a laptop computer, a desktop computer, a notebook, a workstation, a mainframe computer, mobile phone, and personal digital assistant. The client devices 102 are used by clients to exchange information with the distributed file system 104 over the first communication network 106-1. In one implementation, the client devices 102 may transfer a file, for storage, to the distributed file system 104. In said example, the distributed file system 104 may be a Hadoop Distributed File System (HDFS).

The distributed file system 104 can be implemented as a variety of computing devices, such as a laptop computer, a desktop computer, a notebook, a workstation, a mainframe computer, a server, and the like. The distributed file system 104 may be implemented as a distributed computing system including a plurality of data nodes distributed over a network where each data node can be implemented as a computing device, such as a laptop computer, a desktop computer, a notebook, a workstation, a mainframe computer, a server, and the like. Further, the plurality of data nodes may be connected through a second communication network 106-2 for the purpose of communications and exchange of data. Furthermore, one of the plurality of data nodes may be a name node.

For the sake of simplicity, the first communication network 106-1 and the second communication network 106-2 are individually and commonly referred to as network(s) 106 hereinafter. The networks 106 may be wireless networks, wired networks, or a combination thereof. The networks 106 can be a combination of individual networks, interconnected with each other and functioning as a single large network, for example, the Internet or an intranet. The networks 106 may be any public or private network, including a local area network (LAN), a wide area network (WAN), the Internet, an intranet, a peer to peer network, and a virtual private network (VPN) and may include a variety of network devices, such as routers, bridges, servers, computing devices, storage devices, etc. Further, it would be appreciated that the first communication network 106-1 and the second communication network 106-2 may implement same or different networks.

According to an implementation of the present subject matter, each of the plurality of data nodes of the distributed file system 104 may be implemented as a file storage system 108 to store the file transferred from the client devices 102 to the distributed file system 104. The file storage system 108 implemented by each of the plurality of data nodes may facilitate secure communication between the client devices 102 and the distributed file system 104.

According to an implementation, the client device 102-N may include processor(s) 110, interface(s) 112, and memory 114 coupled to the processor(s) 110. In said implementation, the file storage system 108 may also include processor(s) 132, interface(s) 134, and memory 136 coupled to the processor(s) 132.

The processor(s) 110 and the processor(s) 132 of the client device 102-N and the file storage system 108, respectively, may be implemented as one or more microprocessors, microcomputers, microcontrollers, digital signal processors, central processing units, state machines, logic circuitries, and/or any devices that manipulate signals based on operational instructions. Among other capabilities, the processor(s) 110 and the processor(s) 132 may be configured to fetch and execute computer-readable instructions stored in the memory 114 and memory 136, respectively.

Further, interface(s) 112 of the client device 102-N and interface(s) 134 of file storage system 108 may include a variety of software and hardware interfaces, for example, interfaces for peripheral device(s), such as a product board, a mouse, an external memory, and a printer. Additionally, the interface(s) 112 and the interface(s) 134 may enable the client device 102-N and the file storage system 108, respectively, to communicate with other devices, such as web servers and external repositories. The interface(s) 112 and the interface(s) 134 may also facilitate multiple communications within a wide variety of networks and protocol types, including wired networks, for example, LAN, cable, etc., and wireless networks, such as WLAN, cellular, or satellite. For the purpose, the interface(s) 112 and the interface(s) 134 may include one or more ports.

The memory 114 and the memory 136 may include any computer-readable medium known in the art including, for example, volatile memory, such as static random access memory (SRAM), and dynamic random access memory (DRAM), and/or non-volatile memory, such as read only memory (ROM), erasable programmable ROM, flash memories, hard disks, optical disks, and magnetic tapes.

Further, the client device 102-N may include module(s) 116 and data 118. The module(s) 116 include, for example, a segmentation module 120, a communication module 122, a transferring module 124, and other module(s) 126.

The file storage system 108 may include modules(s) 138 and data 140. The module(s) 138 may include a determination module 142, a receiving module 144, an acknowledgement module 146, and other module(s) 148. The other module(s) 126 and the other module(s) 148 may include programs or coded instructions that supplement applications or functions performed by the client device 102-N and the file storage system 108, respectively.

The data 118 may include file data 128 and other data 130. Further, the data 140 includes segment data 150 and other data 152. The other data 130 and other data 152, amongst other things, may serve as a repository for storing data that is processed, received, or generated as a result of the execution of one or more modules in the module(s) 116 and in the modules(s) 138, respectively.

Although, it has been described that the client device 102-N communicates with the file storage system 108, it would be understood that, each client device 102 communicates with the file storage system 108.

According to an implementation, the segmentation module 120 of the client device 102-N may segment a file into a plurality of virtual segments, to be stored onto a plurality of data nodes of the distributed file system 104. In said implementation, at least one virtual segment from amongst the plurality of virtual segments is to be stored onto a data node from amongst the plurality of data nodes. In an implementation, the file to be transferred to the distributed file system 104, may already be stored in the file data 128 of the client device 102-N.

The segmentation of the file into the plurality of virtual segments may be understood as segmenting the file logically into a plurality of segments and not physically. Therefore, each of the plurality of virtual segments may be a logical partition of the file. In one implementation, the segmentation module 120 may determine a total number of virtual segments based on file size and optimum size of each of the plurality of virtual segments. Further, the optimum size of each of the plurality of virtual segments may be equal to or a multiple of a block size used in the distributed file system 104. For example, if the block size used by the distributed file system 104 is 64 megabytes (MB) and size of the file is 1 gigabytes (GB), then the file may be segmented into a plurality of virtual segments of size 64 MB each.

According to one implementation, the segmentation module 120 may determine the total number of virtual segments using equation (1), provided below:

$$TVS = \operatorname{ceiling}\left(\frac{FS}{VSS}\right) \quad \text{Equation (1)}$$

where, TVS represents total number of virtual segments,
FS represents size of the file, and
VSS represents optimum size of a virtual segment.

In one example, if size of the file is 1 GB and optimum size of a virtual segment is 64 MB, then the segmentation module 120 may segment the file into 16 virtual segments.

In one implementation, each of the plurality of virtual segments may be represented by a start byte and an end byte. For example, if the file is of 5000 bytes, then first virtual segment may be represented by a start byte, say 1, and by an end byte, say 100. Similarly, second virtual segment may be represented by a start byte, say 101, and by an end byte, say 200, and so on and so forth.

In one implementation, the communication module 122 of the client device 102-N may receive a plurality of secure connection requests from the plurality of data nodes of the distributed file system 104. In an implementation, a secure connection request may be a Secure Shell (SSH) connection request. Therefore, the communication module 122 may receive a plurality of Secure Shell (SSH) connection requests from the plurality of data nodes. In said implementation, the communication module 122 may further receive at least one file transfer protocol connection request corresponding to each of the plurality of secure connection requests, from the plurality of data nodes, to transfer the plurality of virtual segments to the plurality of data nodes. In an implementation, the transfer protocol connection request may be a Secure Shell File Transfer Protocol (SFTP) connection request. The SSH is a network protocol that allows a file to be exchanged, using a secure channel, between two networked devices and the SFTP is a network protocol that provides file access, file transfer, and file management functionalities.

In one implementation, number of file transfer protocol connection requests received, from each of the plurality of data nodes, by the communication module 122 may depend on a number of virtual segments, from amongst the plurality of virtual segments, to be transferred to each of the plurality of data nodes of the distributed file system 104. The number of virtual segments from amongst the plurality of virtual segments to be transferred to each of the plurality of data nodes may be hereinafter referred to as number of virtual segments per data node. Further, the number of virtual segments per data node may depend on the total number of virtual segments and a maximum number of data nodes in the distributed file system 104 that can be used for transferring the file to the distributed file system 104.

According to one implementation, the communication module 122 may determine the number of virtual segments per data node using equation (2), provided below:

$$NVSDN = \operatorname{ceiling}\left(\frac{TVS}{MDN}\right) \quad \text{Equation (2)}$$

where, NVSDN represents the number of virtual segments per data node,
TVS represents the total number of virtual segments, and
MDN represents maximum number of data nodes in the distributed file system 104 that can be run for transferring the file to the distributed file system 104.

In one example, if the total number of virtual segments is 12 and the maximum number of data nodes in the distributed file system 104 that can be used for transferring the file to the distributed file system 104 is 5, then the number of virtual segments per data node may be 3. In one implementation, the number of virtual segments per data node may be a maximum number of virtual segments per data node. Therefore, in said example, the communication module 122 may receive maximum of number of 3 SFTP connection requests, one for each virtual segment, from each of the 5 data nodes.

Further, number of secure connection requests received by the communication module 122 may be equal to actual number of data nodes of the distributed file system 104. In one implementation, the actual number of data nodes, to be utilized, may be determined based on the total number of virtual segments and the number of virtual segments per data node. In said implementation, the actual number of data nodes may be understood as total number of data nodes used for transferring the file from client device 102-N to the distributed file system 104.

According to one implementation, the communication module 122 may determine the actual number of data nodes using equation (3), provided below:

$$ANDN = \left(\frac{TVS}{NVSDN}\right) \quad \text{Equation (3)}$$

where, ANDN represents the actual number of data nodes,
NVSDN represents the number of virtual segments per data node, and
TVS represents the total number of virtual segments.

Taking the above example, if total number of virtual segments is 12 and the number of virtual segments per data node is 3. Then the actual number of data nodes is 4. Therefore, in said example, the communication module 122 may receive 4 secure connection requests, one from each of the 4 data nodes.

According to an implementation, the transferring module 124 of the client device 102-N may transfer the plurality of virtual segments to the plurality of data nodes of the distributed file system 104 through the plurality of secure connections, in parallel, for storage. In said implementation, a virtual segment from amongst the plurality of virtual segments is transferred to a data node from amongst the plurality of data nodes through a respective file transfer protocol connection and the virtual segment is stored onto the data node from amongst the plurality of data nodes. Consider an example, if total number data nodes in the distributed file system 104 is 4, total number of virtual segments is 12, and number of virtual segments per data node is 3, then the transferring module 124 may transfer 3 virtual segments from the 12 virtual segment to first data node, in parallel, through 3 SFTP connections, such that each virtual segment is transferred via individual SFTP connection. Further, the transferring module 124 may transfer next 3 virtual segments from the remaining virtual segments to second data node, in parallel, through another 3 SFTP connections, and so on and so forth.

According to an implementation of the present subject matter, the determination module 142 of the file storage system 108 may determine a primary set of virtual segments from amongst a plurality of virtual segments of the file to be received from the client device 102-N. In one example, the primary set of virtual segments may include one or more virtual segments. In said implementation, the each of the plurality of virtual segments may be a logical portion of the file. For example, each of the plurality of virtual segments may be represented by a start byte and an end byte. Consider an example where the file is of 5000 bytes, then first virtual segment may be represented by a start byte, say 1, and by an end byte, say 100. Similarly, second virtual segment may be represented by a start byte, say 101, and by an end byte, say 200, and so on and so forth. As mentioned earlier, one of the plurality of data nodes of the distributed file system 104 may be a name node. The name node may allocate one or more virtual segments from amongst the plurality of virtual segments to each of the plurality of data nodes of the distributed file system 104 based on a known scheduling algorithm.

Referring to equation (2) provided above, number of virtual segments in the primary set may be determined based on total number of virtual segments and maximum number of data nodes in the distributed file system 104 that can be used for transferring the file to the distributed file system 104. In an example, if the total number of virtual segments is 12 and the maximum number of data nodes in the distributed file system 104 is 4, then the number of virtual segments per data node may be 3. Now the name node may decide that out of 12 virtual segments which 3 virtual segments may be allocated to each data node. In said example, 3 virtual segments allocated to one data node may form a primary set, next 3 virtual segments allocated to other data node may form a secondary set, and so on and so forth.

As described earlier, each data node of the distributed file system 104 may be implemented as the file storage system 108, therefore, each data node may determine a set of virtual segments from amongst a plurality of virtual segments of the file to be received from the client device 102-N.

According to an implementation, the receiving module 144 of the file storage system 108 may establish a secure connection with the client device 102-N, to receive the primary set of virtual segments from the client device 102-N. In said implementation, the secure connection may be a Secure Shell (SSH) connection. Further, the receiving module 144 may establish a plurality of file transfer protocol connections corresponding to the secure connection, with the client device 102-N. In an example, the file transfer protocol connection may be a Secure Shell File Transfer Protocol (SFTP) connection. In an implementation, a number of file transfer protocol connections may depend on number of virtual segments in the primary set, determined by the determination module 142. Consider an example where the primary set includes 3 virtual segments, the receiving module 144 may establish 3 SFTP connections, one for each virtual segment, with the client device 102-N.

Upon establishing the connections, the receiving module 144 may further receive, in parallel, the primary set of virtual segments from the client device 102-N for storage, through the plurality of file transfer protocol connections, such as Secure Shell File Transfer Protocol (SFTP) connections. The SFTP protocol has an inbuilt capacity of reading a file logically. For example, by providing a start byte and an end byte of each of the virtual segments in the primary set, the receiving module 144 may read and download the primary set of virtual segments from the client device 102-N though the plurality of SFTP connections.

Consider an example where number of virtual segments in the primary set is 3. Also consider that the file size is 5000 bytes, such that first virtual segment is represented by a start byte 1 and by an end byte 1250, second virtual segment is represented by a start byte 1251 and by an end byte 2500, and third virtual segment is represented by a start byte 2501 and by an end byte 3750. In this example, the receiving module 144 may read the file from 1 byte to 1250 bytes through one SFTP connection. Further, in said example, the receiving module 144 may read the file from 1251 bytes to 2500 bytes through another SFTP connection, and from 2501 bytes to 3750 bytes through yet another SFTP connection. The receiving module 144 may receive all three virtual segments in parallel.

As described earlier, each data node of the distributed file system 104 may be implemented as a file storage system 108, therefore, each data node may establish a secure connection, such as a SSH connection, and a plurality of file transfer protocol connections, such as SFTP connections, corresponding to the secure connection, with the client device 102-N, to receive the plurality of virtual segments. Further, each of the plurality of data nodes reads and downloads the plurality of virtual segments from the client device 102-N through the plurality of secure connections, in parallel, where a virtual segment from amongst the plurality of virtual segments is transferred to a data node from amongst the plurality of data nodes through a respective file transfer protocol connection, and the virtual segment is stored on the data node from amongst the plurality of data nodes.

Since the plurality of virtual segments is transferred in parallel, therefore, if there is a network failure or transfer of one or more virtual segments is interrupted because of failure of one or more file transfer protocol connections, such as SFTP connections, then only those one or more virtual segments may have to be retransmitted and not the entire file. In case, there is a file transfer protocol connection failure, the one or more virtual segments may be retransmitted by re-establishing the failed file transfer protocol connection. Taking the above example, where there are 4 data nodes and 16 virtual segments, and 4 virtual segments are allocated to each of the 4 data nodes, then in case of failure of first data node, only 4 virtual segments allocated to the first data node may have to be retransmitted, and not all the 16 virtual segments. In said example, if 3 out of 4 virtual segments have already been transferred to the first data node, then only fourth virtual segment may have to be retransmitted.

In an implementation, the acknowledgement module 146 of the file storage system 108 may send an acknowledgement to the name node after successfully receiving the virtual segments of the primary set. In case, the name node does not receive an acknowledgment for any of one or more virtual segments, then those virtual segments may be received again by the receiving module 144. According to an implementation, after successfully receiving the virtual segments of the primary set, the receiving module 144 stores the primary set of virtual segments in the segment data 150 of the file storage system 108. Further, the acknowledgement module 146 may invoke or call an Application programming interface (API) to logically merge the virtual segments of the primary set into a single file.

According to an implementation, the name node of the distributed file system 104 may store all information related to the file, for example, total number of virtual segments, physical name of the file, and location of each of the plurality of virtual segments. In said implementation, once the plurality of virtual segments is transferred to the distributed file system 104, the distributed file system 104 may treat each virtual segment as a separate file, i.e., each of the plurality of virtual segments may reside as a separate file in the distributed file system 104.

Therefore, once the plurality of virtual segments is downloaded into the distributed file system 104, name of each virtual segment and its location, i.e., on which data node among the plurality of data nodes it is residing, is updated in the name node. Thereafter, the API is called to modify these entries in the name node, such that all the data nodes related to each of the plurality of virtual segments points to a single merged file or a single file. As mentioned earlier, each of the plurality of virtual segments may reside as a separate file in the distributed file system 104 and the separate files are combined together as a single file by the API.

According to the present subject matter, since transfer of the plurality of virtual segments of the file happens in parallel across the plurality of data nodes of the distributed file system 104, using multiple file transfer protocol connections, for example, SFTP connections, unlike the conventional approach where, the entire file is transferred to the plurality of data nodes, using a single SFTP connection. Since, the transfer of the plurality of virtual segments is done in parallel; the time taken to transfer the entire file to the distributed file system 104 is significantly alleviated. Further, according to the present subject matter, if there is a network failure or transfer of one or more virtual segments is interrupted, then only those one or more virtual segments have to be retransmitted and not the entire file. As a result, the entire file is transferred to the distributed file system 104, such as HDFS, in very less time. Thus, according to the present subject matter, the transfer of the file from the client devices 102 to the distributed file system 104 is efficient in terms of time consumed and performance.

FIG. 2 illustrates a method 200 for transferring a file to the distributed file system 104, according to an embodiment of the present subject matter.

The method 200 may be described in the general context of computer executable instructions. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200, or alternative methods. Additionally, individual blocks may be deleted from the methods without departing from the spirit and scope of the subject matter described herein. Furthermore, the method 200 can be implemented in any suitable hardware, software, firmware, or combination thereof.

Referring to FIG. 2, at block 202, the method 200 includes segmenting a file, to be stored onto a plurality of data nodes of a distributed file system 104, into a plurality of virtual segments. In one implementation, at least one virtual segment from amongst the plurality of virtual segments is to be stored onto a data node from amongst the plurality of data nodes. The segmentation of the file into the plurality of virtual segments may be understood as segmenting the file logically into a plurality of segments and not physically. Further, each of the plurality of virtual segments may be represented by a start byte and an end byte. According to an implementation, the segmentation module 120 of the client device 102-N may segment a file into a plurality of virtual segments, to be stored onto a plurality of data nodes of the distributed file system 104.

At block 204, the method 200 includes receiving a plurality of secure connection requests from the plurality of data nodes. In one implementation, a secure connection request may be a Secure Shell (SSH) connection request. The SSH is a network protocol that allows a file to be exchanged, using a secure channel, between two networked devices. Further, number of secure connection requests received may be equal to actual number of data nodes of the distributed file system. In one implementation, the actual number of data nodes may be determined based on the total number of virtual segments and the number of virtual segments per data node. In one implementation, the communication module 122 of the client device 102-N may receive a plurality of secure connection requests from the plurality of data nodes of the distributed file system 104.

At block 206, the method 200 includes obtaining at least one file transfer protocol connection request corresponding to each of the plurality of secure connection requests from the plurality of data nodes. In one implementation, a file transfer protocol connection request may be a Secure Shell File Transfer Protocol (SFTP) connection request. The SFTP is a network protocol that provides file access, file transfer, and file management functionalities. In one implementation, number of file transfer protocol connection requests received, from each of the plurality of data nodes, may depend on a number of virtual segments from amongst the plurality of virtual segments to be transferred to each of the plurality of data nodes of the distributed file system. According to an implementation, the communication module 122 of the client device 102-N may receive at least one file transfer protocol connection request corresponding to each of the plurality of secure connection requests, from the plurality of data nodes, to transfer the plurality of virtual segments to the plurality of data nodes.

At block 208, the method 200 includes transferring the plurality of virtual segments, in parallel, to the plurality of data nodes through the plurality of secure connection requests. In one implementation, a virtual segment from amongst the plurality of virtual segments is transferred to a data node from amongst the plurality of data nodes through a respective file transfer protocol connection and the virtual segment is stored on the data node from amongst the plurality of data nodes. According to an implementation, the transferring module 124 of the client device 102-N may transfer the plurality of virtual segments to the plurality of data nodes of the distributed file system 104 through the plurality of secure connections, in parallel, for storage.

FIG. 3 illustrates a method 300 for receiving the file from the client device, according to an embodiment of the present subject matter.

The method 300 may be described in the general context of computer executable instructions. Generally, computer executable instructions can include routines, programs, objects, components, data structures, procedures, modules, functions, etc., that perform particular functions or implement particular abstract data types. The method 300 may also be practiced in a distributed computing environment where functions are performed by remote processing devices that are linked through a communications network. In a distributed computing environment, computer executable instructions may be located in both local and remote computer storage media, including memory storage devices.

The order in which the method 300 is described is not intended to be construed as a limitation, and any number of the described method blocks can be combined in any order to implement the method 300, or alternative methods. Additionally, individual blocks may be deleted from the methods without departing from the spirit and scope of the subject matter described herein. Furthermore, the method 300 can be implemented in any suitable hardware, software, firmware, or combination thereof.

Referring to FIG. 3, at block 302, the method 300 includes determining a primary set of virtual segments from amongst a plurality of virtual segments of a file to be received from a client device. In one implementation, the each of the plurality of virtual segments may be a logical portion of the file. For example, each of the plurality of virtual segments may be represented by a start byte and an end byte. Further, number of virtual segments in the primary set may be determined based on total number of virtual segments and maximum number of data nodes in the distributed file system. According to an implementation of the present subject matter, the determination module 142 of the file storage system 108 may determine a primary set of virtual segments from amongst a plurality of virtual segments of the file to be received from the client device 102-N.

At block 304, the method 300 includes establishing a secure connection and a plurality of file transfer protocol connections corresponding to the secure connection, with the client device. In one implementation, the secure connection may be a Secure Shell (SSH) connection and a file transfer protocol connection may be a Secure Shell File Transfer Protocol (SFTP) connection. Further, the number of file transfer protocol connections may depend on number of virtual segments in the primary set. According to an implementation, the receiving module 144 of the file storage system 108 may establish a secure connection with the client device 102-N, to receive the primary set of virtual segments from the client device 102-N. In said implementation, the receiving module 144 may further establish a plurality of file transfer protocol connections corresponding to the secure connection, with the client device 102-N.

At block 306, the method 300 includes receiving, in parallel, the primary set of virtual segments from the client device for storage, through the plurality of file transfer protocol connections. In one implementation, the primary set of virtual segments may be received in parallel, such that each virtual segment is received through one of the plurality of file transfer protocol connections. As mentioned above, a file transfer protocol connection may be a Secure Shell File Transfer Protocol (SFTP) connection. The SFTP protocol has an inbuilt capacity of reading a file logically. For example, by providing a start byte and an end byte of each virtual segment in the primary set, the primary set of virtual segments may be downloaded from the client device though the plurality of file transfer protocol connections. According to an implementation, the receiving module 144 of the file storage system 108 may receive, in parallel, the primary set of virtual segments from the client device 102-N for storage, through the plurality of file transfer protocol connections.

At block 308, the method 300 includes invoking an Application Programming Interface (API) to logically merge the virtual segments of the primary set into a single file. In one implementation, once the primary set of virtual segments is transferred to the distributed file system, an API may be invoked to combine the virtual segments of the primary set into a single file. According to an implementation, the acknowledgement module 146 of the file storage system 108 may invoke or call an Application programming interface (API) to logically merge the virtual segments of the primary set into a single file.

Although embodiments for methods and systems for file transfer to a distributed file system have been described in a language specific to structural features and/or methods, it is to be understood that the invention is not necessarily limited to the specific features or methods described. Rather, the specific features and methods are disclosed as exemplary embodiments for file transfer to the distributed file system.

We claim:

1. A client device to transfer a file to a distributed file system, the client device comprising:
   a processor;
   a memory coupled to the processor, wherein the memory stores instructions for execution by the processor to:
   segment a file into a plurality of virtual segments, to be stored onto a plurality of data nodes of the distributed file system, wherein at least one virtual segment from amongst the plurality of virtual segments is stored onto each data node from amongst a plurality of data nodes, wherein each of the plurality of virtual segments is a logical portion of the file;
   receive a request for a plurality of secure connections from the plurality of data nodes of the distributed file system, wherein number of secure connection requests received is equal to actual number of data nodes of the distributed file system, wherein the actual number of data nodes is total number of data nodes used for transferring the file from a client device to the distributed file system, wherein the actual number of data nodes to be utilized is determined based on total number of virtual segments and number of virtual segments per data node,
   wherein the total number of virtual segments is determined based on file size and size of each of the plurality of virtual segments,
   and wherein the number of virtual segments per data node is determined based on the total number of virtual segments and a maximum number of data nodes for transferring each of the plurality of virtual segments to the distributed file system;
   transfer the determined number of virtual segments per data node through a corresponding secure connection from the plurality of connections in parallel, wherein each of the determined number of virtual segments is transferred to each of the data node through respective file transfer protocol connection;
   detect a network failure in the file transfer protocol connection while transferring the determined number of virtual segments; and retransmit only the determined number of virtual segments to the distributed file system by re-establishing the failed file transfer protocol connection.

2. The client device as claimed in claim 1, wherein the distributed file system is a Hadoop Distributed File System (HDFS).

3. The client device as claimed in claim 1, wherein a secure connection request is a Secure Shell (SSH) connection request.

4. The client device as claimed in claim 1, wherein one secure connection request is obtained from each of the plurality of data nodes.

5. The client device as claimed in claim 1, wherein a file transfer protocol connection request is a Secure Shell File Transfer Protocol (SFTP) connection request.

6. The client device as claimed in claim 1, wherein the size of each of the plurality of virtual segments is equal to a block size in the distributed file system.

7. The client device as claimed in claim 1, wherein the size of each of the plurality of virtual segments is a multiple of a block size in the distributed file system.

8. A method for transferring a file from a client device to a distributed file system, the method comprising:
   segmenting a file, to be received from the client device, into a plurality of virtual segments, to be stored onto a plurality of data nodes of the distributed file system, wherein at least one virtual segment from amongst the plurality of virtual segments is stored onto each data node from amongst a plurality of data nodes, wherein each of the plurality of virtual segments is a logical portion of the file;
   receiving a request for a plurality of secure connections from the plurality of data nodes of the distributed file system, wherein number of secure connection requests received is equal to actual number of data nodes of the distributed file system, wherein the actual number of data nodes is total number of data nodes used for transferring the file from a client device to the distributed file system, wherein the actual number of data nodes to be utilized is determined based on total number of virtual segments and number of virtual segments per data node,
      wherein the total number of virtual segments is determined based on file size and size of each of the plurality of virtual segments,
      and wherein number of virtual segments per data node is determined based on the total number of virtual segments and a maximum number of data nodes for transferring each of the plurality of virtual segments to the distributed file system;
   transferring the determined number of virtual segments per data node through a corresponding secure connection from the plurality of connections in parallel, wherein each of the determined number of virtual segments is transferred to each of the data node through respective file transfer protocol connection;
   detecting a network failure in the file transfer protocol connection while transferring the determined number of virtual segments;
   retransmitting only the determined number of virtual segments to the distributed file system by re-establishing the failed file transfer protocol connection;
   downloading the virtual segments, and updating name of each virtual segment and location of the virtual segment indicating the data node among the plurality data nodes in a name node of the distributed file system; and
   invoking an Application programming interface (API) to logically merge the virtual segments into a single file and also modifying entries in the name node such the plurality of data nodes related to each of the plurality of virtual segments points to the single file.

9. The method as claimed in claim 8, wherein each of the virtual segments is received through a different file transfer protocol connection.

10. The method as claimed in claim 8, wherein the secure connection is a Secure Shell (SSH) connection.

11. The method as claimed in claim 8, wherein a file transfer protocol connection is a Secure Shell File Transfer Protocol (SFTP) connection.

12. A non-transitory computer-readable medium having embodied thereon a computer program for executing a method comprising:
   segmenting a file, to be received from the client device, into a plurality of virtual segments, to be stored onto a plurality of data nodes of the distributed file system, wherein at least one virtual segment from amongst the plurality of virtual segments is stored onto each data node from amongst a plurality of data nodes, wherein each of the plurality of virtual segments is a logical portion of the file;
   receiving a request for a plurality of secure connections from the plurality of data nodes of the distributed file system, wherein number of secure connection requests received is equal to actual number of data nodes of the distributed file system, wherein the actual number of data nodes is total number of data nodes used for transferring the file from a client device to the distributed file system, wherein the actual number of data nodes to be utilized is determined based on total number of virtual segments and number of virtual segments per data node,
      wherein the total number of virtual segments is determined based on file size and size of each of the plurality of virtual segments,
      and wherein number of virtual segments per data node is determined based on the total number of virtual segments and a maximum number of data nodes for transferring each of the plurality of virtual segments to the distributed file system;
   transferring the determined number of virtual segments per data node through a corresponding secure connection from the plurality of connections in parallel, wherein each of the determined number of virtual segments is transferred to each of the data node through respective file transfer protocol connection;
   detecting a network failure in the file transfer protocol connection while transferring the determined number of virtual segments; and
   retransmitting only the determined number of virtual segments to the distributed file system by re-establishing the failed file transfer protocol connection.

13. The non-transitory computer-readable medium as claimed in claim 12, wherein the distributed file system is a Hadoop Distributed File System (HDFS).

14. The non-transitory computer-readable medium as claimed in claim 12, wherein each of the plurality of virtual segments is represented by a start byte and an end byte.

15. The non-transitory computer-readable medium as claimed in claim 12, wherein one secure connection request is obtained from each of the plurality of data nodes.

16. The non-transitory computer-readable medium as claimed in claim 12, wherein a second virtual segment from amongst the plurality of virtual segments is transferred to the first data node from amongst the plurality of data nodes through a second file transfer protocol connection, and wherein the second virtual segment from amongst the plurality of virtual segments is stored on the first data node from amongst the plurality of data nodes.

17. The non-transitory computer-readable medium as claimed in claim 16, wherein the first virtual segment and the second virtual segment are transferred simultaneously in parallel from a user device to the first node respectively through the first file transfer protocol connection and the second file transfer protocol connection.

18. The non-transitory computer-readable medium as claimed in claim 12, wherein a third virtual segment from amongst the plurality of virtual segments is transferred to the second data node from amongst the plurality of data nodes through a third file transfer protocol connection, and wherein the third virtual segment from amongst the plurality of virtual segments is stored on the second data node from amongst the plurality of data nodes.

\* \* \* \* \*